United States Patent [19]

Sjoberg

[11] Patent Number: 4,735,129
[45] Date of Patent: Apr. 5, 1988

[54] SINGLE ACTING MUD PUMP PISTON
[75] Inventor: James G. Sjoberg, Humble, Tex.
[73] Assignee: Chromium Corporation, Dallas, Tex.
[21] Appl. No.: 500,984
[22] Filed: Jun. 3, 1983
[51] Int. Cl.⁴ .............................................. H16J 9/00
[52] U.S. Cl. ........................................ 92/251; 92/240; 92/255
[58] Field of Search ................. 92/240, 248, 249, 250, 92/251, 255, 257, 245

[56] References Cited

U.S. PATENT DOCUMENTS

| | | | |
|---|---|---|---|
| 1,517,489 | 12/1924 | Barwood | 92/240 |
| 2,233,030 | 2/1941 | Penick | 92/251 |
| 2,512,098 | 6/1950 | Gratzmuller | 92/240 |
| 2,677,581 | 5/1954 | Taylor, Jr. | 92/251 |
| 4,143,586 | 3/1979 | Zitting | 92/240 |
| 4,459,899 | 7/1984 | Richardson | 92/249 |

Primary Examiner—Deborah L. Kyle
Assistant Examiner—Richard L. Klein
Attorney, Agent, or Firm—Hubbard, Thurman, Turner & Tucker

[57] ABSTRACT

Disclosed is a single acting mud pump piston assembly adapted for use in a mud pump mechanism including a piston and having an end portion with a shoulder reciprocatingly mounted in a cylinder. The assembly includes a circular flange mounted on the end portion in abuttment with the shoulder. A hub is removably mounted on the end portion in abuttment with the flange. A piston cap is mounted about the hub in abuttment with the flange. The assembly is held together by a washer and a nut engaging the end portion.

2 Claims, 1 Drawing Sheet

U.S. Patent
Apr. 5, 1988
4,735,129
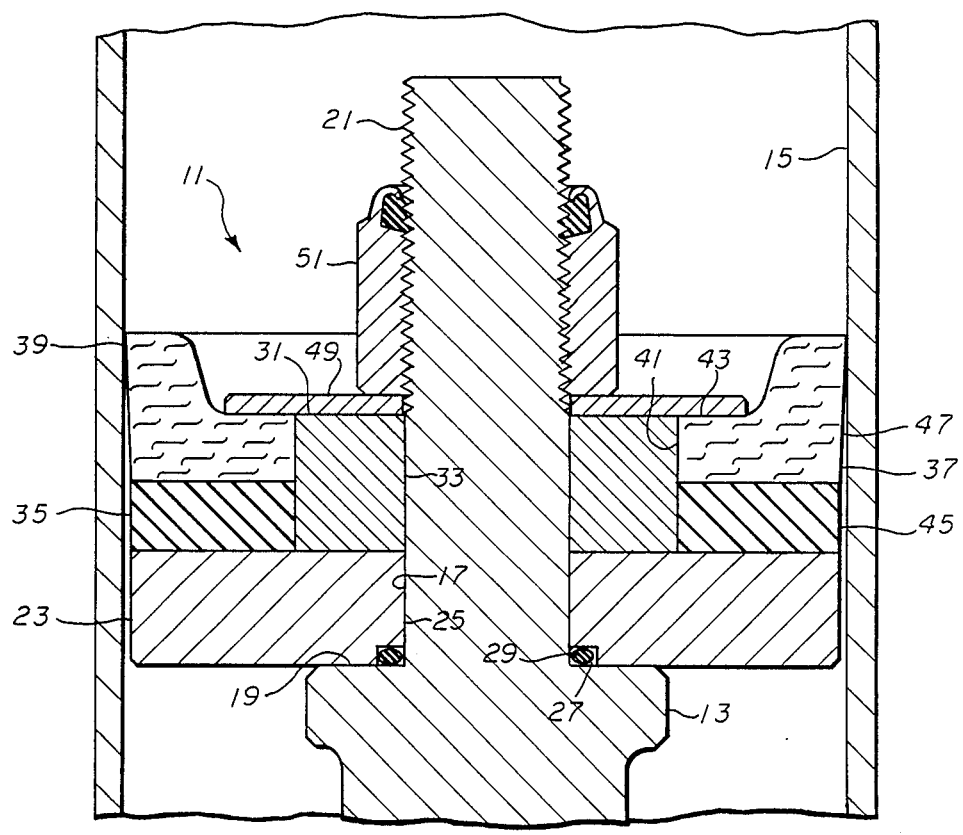

SINGLE ACTING MUD PUMP PISTON

BACKGROUND OF THE INVENTION

A. Field of the Invention

The present invention relates generally to mud pump pistons, and more particularly to a single acting mud pump piston having a multi-component flange and hub assembly.

B. Description of the Prior Art

Mud pumps are used in the oil and gas drilling industry for circulating drilling fluids, which are commonly and collectively referred to as mud. Mud pumps are positive displacement type pumps that include pistons mounted on reciprocating rods within cylindrical sleeves or liners.

Historically, the first mud pumps were of the duplex type. Duplex pumps include a double sided piston and cylinder arrangement which is adapted to pump in both directions of reciprocation. Duplex pump pistons include a unitary forged piston body which includes a central flange with hubs extending axially from both sides of the flange. Piston rubbers are mounted on the hubs in contact with the flange. The piston rubbers are held on to the piston body by a retainer plate and a snap ring.

More recently, there have been developed single acting multiplex mud pumps, which pump in a single direction of reciproction. Single acting multiplex mud pump pistons are, in effect, duplex mud pump pistons cut axially in half. Indeed, certain manufacturers refer to multiplex mud pump pistons as "half-pistons." More specifically, single acting multiplex mud pump pistons include a unitary forged piston body, which includes a unitary flange with the hub extending axially from one side thereof, and a piston rubber which is retained on the hub in contact with the flange by a retainer plate and snap ring.

There are numerous disadvantages inherent in the construction of presently available mud pump pistons. There are a number of sites that are subject to wear, but at differential rates. The rubbers are most subject to wear and therefore have the shortest expected life of the components of the piston. It would be advantageous to be able simply to replace the rubber periodically. However, the metal parts of the piston are also subject to wear.

A primary wear site is the periphery of the piston body flange, which over time becomes worn down. As the periphery of the piston body flange wears, the rubber has an increased tendency to flow or extrude between the piston body flange and the cylinder wall, thereby leading to failure of the rubber. Another wear site in the piston body assembly is in the snap ring and retaining groove. As the piston reciprocates, the snap ring works back and forth in the groove causing wear to both. As the snap ring and groove wear, the movement therebetween increases and thereby increases the wear. Also, increased movement of the snap ring with respect to the groove causes increased movement and wear of the rubber. When rubbers are replaced, it is common also to replace the retainer plate and snap ring. However, because of the wear to the snap ring groove, replacement of the snap ring does not return the piston to its original tolerances. Thus, replaced snap rings and rubbers have shorter lifes than originals.

A further site of wear or failure is in the piston body itself, primarily at the connection between the flange and the hub. Stresses due to bending of the flange are concentrated at the connection with the hub, which stresses in some cases lead to cracks in the piston body. Additionally, fluid sometimes is able to flow between the rubber and the hub, thereby leading to washout of the hub. Since the piston body is a unitary forging, if any part thereof, i.e. flange, hub, or snap ring groove, is worn, damaged, or out of tolerance, the entire piston body must be replaced.

It is an object of the present invention to provide a single acting mud pump piston that overcomes the shortcomings of the prior art. It is a further object of the present invention to provide a single acting mud pump piston that maximizes the operating life of the various components thereof. It is a further object of the present invention to provide a single acting mud pump piston that is economical to produce and maintain. It is a further object of the present invention to provide a single acting mud pump piston that may be repaired or reconditioned by replacing only the worn parts.

SUMMARY OF THE INVENTION

The foregoing and other objects are accomplished by the piston assembly of the present invention. The piston assembly is adapted for use in a single acting mud pump which includes a cylinder and a piston rod. The piston rod includes a reduced diameter cylindrical end portion with at least the end of the end portion being threaded.

The piston assembly includes a flat circular flange having an outside diameter less than the inside diameter of the cylinder and a bore through its center. The bore has a diameter substantially equal to the diameter of the end portion of the piston rod. The flange is adapted to be carried on the end portion of the piston rod. Means are provided for forming a seal between the flange and the piston rod.

The piston assembly includes a circular planar hub having an outside diameter less than the outside diameter of the flange and a bore through its center. The bore has a diameter substantially equal to the diameter of the end portion of the piston rod. The hub is adapted to be carried by the end portion of the piston rod in abutting relationship with the flange.

A circular piston cup is carried about the hub in removable abutting relationship with the flange. The piston cup has a body with an outside diameter substantially equal to the outside diameter of the flange and an outwardly flaring annular lip having an outside diameter greater than the inside diameter of the cylinder. The piston cup has a bore through its center with a diameter substantially equal to the outside diameter of the hub. The piston cup has a central portion surrounding the bore with an axial thickness greater than the axial thickness of the hub.

A circular planar washer is provided having an outside diameter greater than the outside diameter of the hub and an inside diameter substantially equal to the diameter of the end portion of the piston rod. The washer is adapted to be carried by the end portion of the piston rod in removable abutting relationship with the hub and the central portion of the piston cup. A retaining nut is adapted to threadedly engage the threaded portion of the piston rod to axially compress the central portion of the piston cup and urge the washer into abuttment with the hub.

BRIEF DESCRIPTION OF THE DRAWING

The drawing is a sectional view of the single acting mud pump piston assembly of the present invention mounted on a fragment of a mud pump piston rod within a fragment of a mud pump cylinder.

DESCRIPTION OF THE PREFERRED EMBODIMENT

Referring now to the drawing, the piston assembly of the present invention is designated generally by the numeral 11. Piston assembly 11 is adapted for mounting on a mud pump piston rod 13 a reduced diameter end portion 17 of in abuttment with a shoulder 19 for reciprocating movement within a mud pump cylinder 15. End portion 17 includes a threaded portion 21.

Piston assembly 11 includes a circular planar flange 23. Flange 23 has an outside diameter less than the inside diameter of cylinder 15 so as to be reciprocable therein. Flange 23 has a bore 25 through its center having a diameter substantially equal to the diameter of end portion 17 of piston rod 13. Flange 23 is removably carried by end portion 17 in abuttment with shoulder 19. A generally "L" shaped recess 27 is formed in flange 23 about bore 25 and carries therein an O-ring 29 for providing a seal between piston rod 13 and flange 23. Flange 23 is preferably made from steel barstock.

A circular planar hub 31 is carried by end portion 17 of piston rod 13 in removable abutting relationship with flange 23. Hub 31 has an outside diameter that is smaller than the outside diameter of flange 23. Hub 31 has a bore 33 through its center having a diameter substantially equal to the diameter of end portion 17. Hub 31 is also preferably formed from steel barstock.

A circular piston cup 35 is carried about hub 33 in removable abutting relationship with flange 23. Piston cup 35 includes a circular body portion 37 having an outside diameter substantially equal to the outside diameter of flange 23. Piston cup 35 also includes an outwardly flaring annular lip portion 39 having an outside diameter greater than the inside diameter of cylinder 15 so as to sealingly interfit therewith.

Piston cup 35 includes a central bore 41 having a diameter substantially equal to the diameter of hub 31. A flat central portion 43 is defined in piston cup 35 about central bore 41. The axial thickness of piston cup 35 in central portion 43 is at least as great as and preferably greater than the axial thickness of hub 31.

Piston cup 35 is preferably a compound structure that includes a reinforced section 45 and an unreinforced section 47. Reinforced section 45 is made with a plurality of fabric sheets embedded in an elastomeric rubber-like material. Reinforced section 45 is resistant to extrusion or flow between flange 23 and cylinder 15 during operation. Unreinforced section 47 is formed of the elastomeric material.

A circular planar washer 49 is carried about end portion 17 in removable abutting relationship with hub 31 and central portion 43 of piston cup 35. Washer 49 has an outside diameter greater than the outside diameter of hub 31 and an inside diameter substantially equal to the diameter of end portion 17. A self-locking nut 51 is provided for threadably engaging threaded portion 21 of end portion 17 of piston rod 13 for urging washer 49 axially into abuttment with hub 31 and to compress axially central portion 43 of piston cup 35. As central portion 43 of piston cup 35 is compressed, piston cup 35 seals about hub 31 and over flange 23, thereby to prevent fluid from flowing between piston cup 35 and hub 31 or flange 23.

Piston assembly 11 is assembled by first mounting flange 23 and O-ring 29 on end portion 17 of piston rod 13 in abuttment with shoulder 19. Hub 31 is then abutted with flange 23 with piston cup 35 thereabout. Washer 49 is then mounted over end portion 17 and nut 51 is threaded down to urge washer 49 into abuttment with flange 31 and central portion 43 of piston cup 35.

From the foregoing it is seen that the assembly of the present invention is well adapted to overcome the shortcomings of the prior art. If any part of the assembly becomes worn or damaged, that part may be replaced to fully recondition the entire assembly.

What is claimed is:

1. A piston assembly for use in a single acting mud pump including a cylinder and a piston rod reciprocatingly mounted in the cylinder, said piston rod including a cylindrical end portion and a radially outwardly extending shoulder, said piston assembly comprising:

a circular planar flange having an outside diameter less than the inside diameter of the cylinder and having a bore through the center thereof, said bore having a diameter substantially equal to the diameter of said cylindrical end portion of said piston rod, said flange being adapted to be carried on said cylindrical end portion in abuttment with said shoulder;

means for forming a seal between said flange and said piston rod;

a circular planar hub having an outside diameter less than the outside diameter of said flange and having a bore through the center thereof, said bore having a diameter substantially equal to the diameter of said cylindrical end portion of said piston rod, said hub having an axial thickness, said hub being adapted to be carried by said cylindrical end portion of said piston rod in removable abutting relationship with said flange;

a circular elastomeric piston cup having a body with an outside diameter substantially equal to the outside diameter of said flange and an outwardly flaring annular lip having an outside diameter greater than the inside diameter of the cylinder, said piston cup having a bore through the center thereof, said bore having a diameter substantially equal to the outside diameter of said hub, said piston cup having a central portion surrounding said bore having an axial thickness at least equal to the axial thickness of said hub, said piston cup being adapted to be removably carried about said hub in removable abutting relationship with said flange;

a circular planar washer having an outside diameter greater than the outside diameter of said hub and an inside diameter substantially equal to the diameter of said cylindrical end portion of said piston rod, adapted to be carried by said cylindrical end portion of said piston rod in removable abutting relationship with said hub and the central portion of said piston cup;

and a retaining nut adapted to threadably engage said cylindrical end portion of said piston rod to urge said washer into abuttment with said hub and said central portion of said piston cup.

2. A single acting mud pump mechanism which comprises:

a cylinder having an inside diameter;

a piston rod reciprocatingly mounted in said cylinder, said piston rod including a threaded cylindrical end portion and a radially outwardly extending shoulder;

a circular planar flange removably mounted on said end portion in abuttment with said shoulder and having an outside diameter less than the inside diameter of the cylinder and having a bore through the center thereof, said bore having a diameter substantially equal to the diameter of said cylindrical end portion of said piston rod;

means for forming a seal between said flange and said piston rod;

a circular planar hub removably mounted on said end portion in abuttment with said flange and having an outside diameter less than the outside diameter of said flange and having a bore through the center thereof, said bore having a diameter substantially equal to the diameter of said end portion of said piston rod, said hub having an axial thickness;

a circular elastomeric piston cup removably mounted about said hub and in abuttment with said flange and having a body with an outside diameter substantially equal to the outside diameter of said flange and an outwardly flaring annular lip having an outside diameter greater than the inside diameter of the cylinder, said piston cup having a bore through the center thereof, said bore having a diameter substantially equal to the outside diameter of said hub, said piston cup having a central portion surrounding said bore having an axial thickness at least equal to the axial thickness of said hub;

a circular planar washer removably mounted about said end portion and having an outside diameter greater than the outside diameter of said hub and an inside diameter substantially equal to the diameter of said cylindrical end portion of said piston rod;

and a retaining nut threadably engaged with said cylindrical end portion of said piston rod to urge said washer into abuttment with said hub and said central portion of said piston cup.

* * * * *